Oct. 10, 1944.   H. T. LANNEN   2,360,062
METHOD OF OVEN-BAKING BEANS OR THE LIKE IN QUANTITY
Filed Dec. 16, 1940
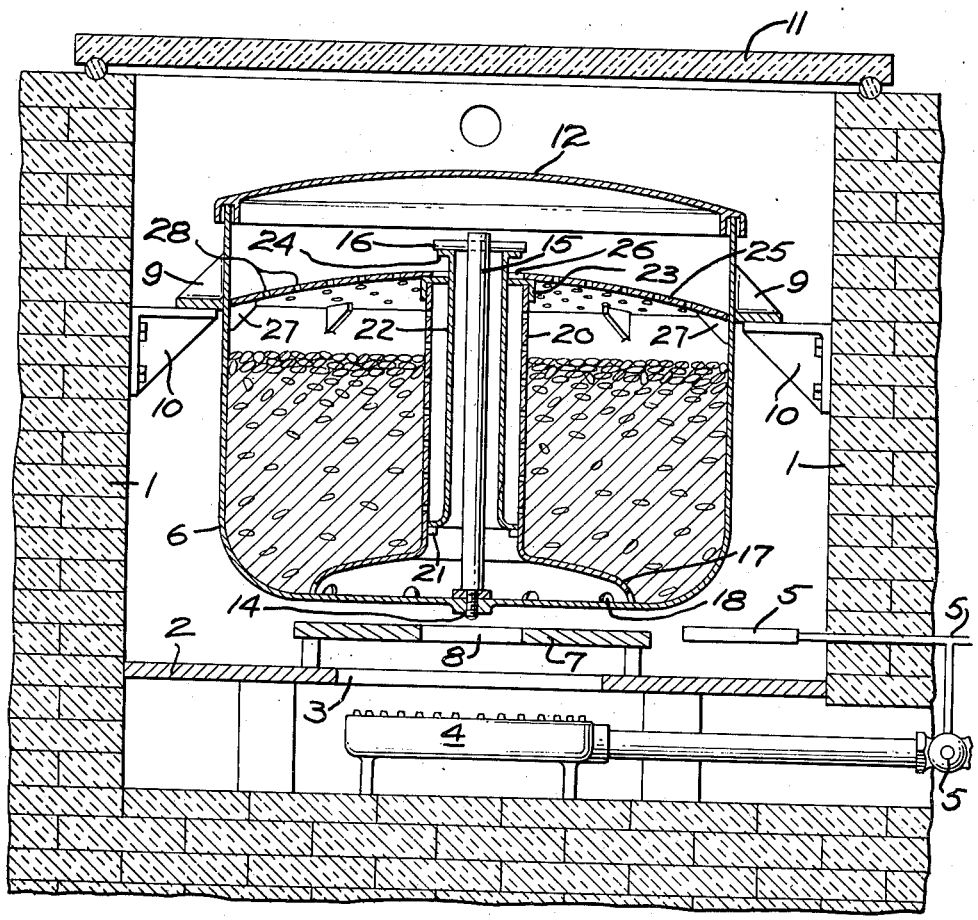
INVENTOR.
HAROLD T. LANNEN
BY
Lippincott & Metcalf
ATTORNEYS.

Patented Oct. 10, 1944

2,360,062

UNITED STATES PATENT OFFICE 2,360,062

METHOD OF OVEN-BAKING BEANS OR THE LIKE IN QUANTITY

Harold T. Lannen, San Francisco, Calif., assignor to S & W Fine Foods, Inc., San Francisco, Calif., a corporation of California Application December 16, 1940, Serial No. 370,378

8 Claims. (Cl. 99—98)

My invention relates to baked beans, and more particularly to a method of oven-baking beans or the like in quantity for commercial sale in sealed containers.

Canned beans as supplied to the retail market are of two general types. One type is known as "baked beans." In canning this type of beans, it is customary for the beans to be blanched, placed in a tin can with raw pork and syrup added. The tins are then sealed, and passed through a steam chest or a requisite amount of time to cook the beans, usually about 30 minutes. In this connection, the term "syrup" as used herein includes water alone or combined with sugar, salt, spices, or flavoring, which in liquid form is supplied to the cans or to the beans to form the liquid content of the product.

A second type of canned beans presented to the retail trade is known as "oven-baked" beans, and the procedure of processing oven-baked beans is radically different from that of producing ordinary "baked beans" referred to first above.

Oven-baked beans are usually cooked in batches, in large pots or kettles, prior to being inserted in the can. After being sealed in the cans they are given a sterilization treatment only, in a steam chest. The present invention has to do with a means and method of producing oven-baked beans in large quantities, as the problems which are thereby presented are altogether different than those encountered in cooking smaller quantities as in the home.

Among the objects of my invention are: To provide a method of oven-baking beans in large quantities, with uniform processing of the beans, irrespective of their position in the container; to provide a uniform baking of the beans on the top and bottom of the batch; to provide a method of uniformly distributing hot syrup through the entire mass of beans during the baking process; to provide a method whereby the consistency of the syrup content of the kettle is automatically maintained evenly throughout the bean mass during the baking cycle, and to provide an oven-baked bean product having uniform color, uniform taste and uniform glazing.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

The drawing is a sectional view taken through a baking oven, together with its kettle and bean mass, showing the application of my method, and the apparatus for applying it, to the oven-baking of beans.

Referring directly to the drawing for a more detailed description of my invention, a brick oven is provided having upright side walls 1, and a bottom 2 with a central aperture 3 therein. Immediately below the central aperture is a heating element 4, which may be a gas flame as shown, or an electrical heating element if desired, controlled by a thermostat system 5. Obviously the type of heating element is not important to the practice of my invention. Immediately over central aperture 3 and raised above it is a baffle 7 provided with a central aperture 8. A kettle 6 is suspended over and just above baffle 7, kettle flanges 9 resting on oven wall lugs 10. The top of the oven is closed with an insulating cover 11, thus completing the oven structure. Bean kettle 6 is provided with a metal cover 12. The bottom of the kettle 6 is provided with a central threaded aperture 14 in which is screwed an upright pin 15 having a cross pin 16 extending therethrough adjacent the top thereof. Surrounding aperture 14 and pin 15, is a removable bell 17 having edge apertures 18 therein adjacent the floor of the kettle. The bell, after contracting in size extends upwardly as a perforated cylinder 20 coaxially positioned around pin 15, the perforations being smaller than the dry beans. Adjacent the junction of cylinder 20 with bell 17, is positioned an interior shoulder 21 attached to cylinder 20 on which the bottom of an imperforate cylinder 22 rests, this imperforate cylinder 22 also extending upwardly. At the level of the top of perforate cylinder 20 an outwardly extending cap 23 is attached to imperforate cylinder 22, this cap covering the top of perforate cylinder 20. Imperforate cylinder 22 then continues upwardly beyond cap 23 and terminates in a flange 24, immediately below cross-pin 16. A removable spreader plate 25 is provided having a central aperture 26, the edges of this aperture resting on cap 23. The periphery of plate 25 rests on lugs 27 extending from the interior of the kettle, and plate 25 is slightly concaved upwardly. Thus when pin 15 is screwed in place cross-pin 16 contacts flange 24 and holds the entire central structure in place. Spreader plate 25 is also provided with a plurality of distribution apertures 28. This completes the description of the oven and kettle structure, and I will now describe a typical baking cycle together with the operation of my invention during and after this baking cycle.

While I do not wish to be bound to the exact figures given here below, the procedure to be described has been utilized commercially in the production of oven-baked beans and have proved to be highly satisfactory, and to give a very satisfactory oven-baked product. For example, kettle 6 may be of the capacity of around 80 gallons. The kettle may be initially charged with 250 pounds of clean, dry beans, and 30 gallons of syrup. This syrup will contain the seasoning and flavoring as may be desired to produce the final taste of the beans. The beans are then baked about 1½ hours at 400°, and for ½ hour at 350°, and at that time, the beans having swelled and absorbed a great deal of the initial syrup, 10 or 11 more gallons of a lighter syrup are added to the beans, and the beans are then cooked 2½ hours longer at 260°. At this time 10 to 11 more gallons of syrup or water are added in accordance with the quality of beans being baked, and the beans are baked 3½ hours at 250°, thus providing an 8 hour baking cycle. The action of the central structure of the kettle will next be described.

From the very beginning of the baking cycle the central structure as above described acts as a percolation device continually circulating hot syrup through the beans. The action is as follows:

The syrup in the bottom of the kettle enters bell 17 through holes 18, and due to steam pressure built up within the bell, this liquid is forced upwardly between central pin 15 and imperforate cylinder 22, until it spills over and is forced out of the top of the cylinder 22 at flange 24. Some of the liquid will land directly on spreader plate 25, and another portion of the liquid will hit cover 12. Either way the liquid is distributed over spreader plate 25 and passes downwardly through apertures 28 therein, and passes uniformly through the bean mass until it reaches the bottom. In this manner the bean syrup is continuously passing through the bean mass, and as a consequence the beans at the edge of the kettle are baked no more and no less than are the central beans surrounding perforate cylinder 20. Furthermore, due to the fact that the top of the bean mass exposed to the atmosphere of the kettle is continuously bathed in liquid, the beans do not burn at the top surface, nor do they dry out. The result of this continual percolation and circulation of hot syrup through the beans, not only produces equal cooking of the beans in all portions of the large mass thereof, but also imparts to the beans a color which is uniform in all parts of the bean mass, and in addition produces, on the individual beans, a gloss which is highly desirable in the finished product and which is not usually present in beans baked en masse without continual syrup circulation.

After the 8 hours baking with this continual circulation of syrup, the kettle may be removed from the oven. In this condition the kettle contains, in addition to the beans, the remaining juice which is thickened and which is smaller in liquid quantity than originally supplied to the beans. The kettle is then placed over a container, cover 12 is removed, spreader plate 25 is removed and then pin 15 is unscrewed whereupon imperforate cylinder 22 with its cap 23 may also be removed. The weight of the beans holds bell 17 and perforate cylinder 20 in place and the juice remaining in the beans then drains from the mass of the beans through the apertures in perforate cylinder 20 and through lower apertures 18, out of hole 14 into the outside container beneath the kettle. The drained beans may then be fed into cans passing through a canning machine. Meantime the juice removed from the beans is diluted, in accordance with its consistency, and fed into the bean filled cans before capping. The cans are then capped and sealed and passed through the sterilizer to be labeled as true oven-baked beans.

The kettle parts may then be cleaned, the percolator structure replaced and the baking cycle repeated.

It should be noted that percolation is greatly aided by the use of aperture 8 in baffle 7, so that a hot spot is provided in the bottom of the kettle within the periphery of bell 17. This causes pressure to be built up within the bell with consequent percolation. Such a hot spot, however, cannot burn the beans as the extra heat is expended directly against the juice alone and does not come into contact with the beans.

I also wish to point out that by the use of percolation as outlined above, I am able to thoroughly and completely mix the liquids that may be added during the baking of the beans, with the juices that are already in the bean mass. It is to be noted that in this regard I may prefer to add liquid which is of different consistency than the syrup in the bean mass, and that at least one addition of liquid may be in the form of plain water. In an ordinary bean kettle without percolation, the addition of liquids having a different consistency than the liquids already in the bean mass would require a thorough stirring of the bean mass in order to obtain a proper mixture of the new and old liquids. Such stirring is not desirable, particularly in the last stages of the baking cycle, inasmuch as the beans are then relatively soft and any extensive stirring will be bound to bruise and break the beans with resultant reduction in quality. With the use of the means and method outlined above, I can add liquid directly to the top of the bean mass and the circulation due to percolation will thoroughly and completely mix the new liquid with the old.

In the above described manner I have been able to oven-bake beans or the like in large quantities with completely uniform and controllable results, by the batch method.

I claim:

1. The method of oven-baking beans which comprises placing a charge of beans and liquid in a container in a heated oven, heating said oven to a temperature sufficient to bake said charge and percolating said liquid substantially uniformly through the bean mass during the baking thereof.

2. The method of oven-baking beans which comprises placing a charge of dry beans and liquid in a container in a heated oven, heating said oven to a temperature sufficient to bake said charge and percolating said liquid substantially uniformly through the bean mass during during the baking thereof.

3. The method of oven-baking beans which comprises placing a charge of dry beans and liquid in a container in a heated oven, heating said oven to a temperature sufficient to bake said charge and percolating hot liquid from the bottom of the container downwardly substantially uniformly through the bean mass during the baking thereof.

4. The method of oven-baking beans which comprises placing a charge of dry beans and liquid in a container in a heated oven, heating said oven to a temperature sufficient to bake said charge and percolating hot liquid from the bottom of the container downwardly substantially uniformly through the bean mass throughout the baking thereof.

5. The method of oven-baking beans and the like which comprises heating a mass of beans and syrup to a baking temperature in an oven, repeatedly circulating said syrup downwardly through said bean mass during boiling until a substantial portion of said syrup has been absorbed by said beans, adding a quantity of lighter syrup, and continuing the heating of said beans at a lower temperature while maintaining said circulation.

6. The method of oven-baking beans which comprises placing a charge of dry beans and liquid in a container in a heated oven, heating said oven to a temperature sufficient to bake said charge, percolating hot liquid from the bottom of the container downwardly substantially uniformly through the bean mass, and supplying additional liquid to said charge in accordance with absorption of liquid by said beans during the baking thereof.

7. The method of oven-baking beans which comprises baking a charge of beans and liquid at approximately 400° for a predetermined time, continuously circulating said liquid through said beans, supplying additional liquid to said beans at the end of said time in accordance with the absorption of liquid by said beans, baking said beans for an additional time while maintaining said liquid circulation.

8. The method of oven-baking beans which comprises baking a charge of beans and liquid at approximately 400° for a predetermined time, continuously circulating said liquid through said beans, supplying additional liquid to said beans at the end of said time in accordance with the absorption of liquid by said beans, baking said beans for an additional time at a lower temperature while maintaining said liquid circulation

HAROLD T. LANNEN.